(12) United States Patent
Pottier et al.

(10) Patent No.: US 8,907,001 B2
(45) Date of Patent: Dec. 9, 2014

(54) USE OF A PRETREATED PRECIPITATED SILICA AS A REINFORCING FILLER FOR SILICON ELASTOMER AND THE CURABLE SILICONE ELASTOMER COMPOSITIONS THUS OBTAINED BY COLD MIXING

(75) Inventors: Agnès Pottier, Paris (FR); Kyu-Min Hwang, Seoul (KR); Minoru Igarashi, Gunma-ken (JP); Tsutomu Nakamura, Gunma-ken (JP); Nahohiko Harada, Kanagawa-ken (JP)

(73) Assignees: Rhodia Chimie, Aubervilliers (FR); Shin-Etsu Chemical Co., Ltd, Tokyo (JP)

( * ) Notice: Subject to any disclaimer, the term of this patent is extended or adjusted under 35 U.S.C. 154(b) by 0 days.

(21) Appl. No.: 12/461,283

(22) Filed: Aug. 6, 2009

(65) Prior Publication Data

US 2010/0168276 A1   Jul. 1, 2010

Related U.S. Application Data

(63) Continuation of application No. 10/587,809, filed as application No. PCT/EP2005/000843 on Jan. 28, 2005, now abandoned.

(30) Foreign Application Priority Data

Jan. 30, 2004   (EP) .................................... 04290243

(51) Int. Cl.
   *C08K 9/06*   (2006.01)
(52) U.S. Cl.
   CPC ........................ *C08K 9/06* (2013.01)

USPC .......................................... 524/492; 523/209

(58) Field of Classification Search
   USPC ................. 106/490; 427/215, 213, 220, 221;
         428/504; 464/588; 523/212, 213;
         524/406, 445, 446, 478, 479, 488, 492,
         524/493, 494, 497, 863; 525/100, 103, 106,
         525/476, 477; 556/482; 564/860
   See application file for complete search history.

(56) References Cited

U.S. PATENT DOCUMENTS

| | | | |
|---|---|---|---|
| 3,862,081 A * | 1/1975 | Itoh et al. ...................... | 524/588 |
| 5,009,874 A * | 4/1991 | Parmentier et al. ........... | 423/335 |
| 2003/0181565 A1* | 9/2003 | Panz et al. ..................... | 524/492 |
| 2005/0165161 A1* | 7/2005 | Igarashi et al. ................ | 524/865 |

FOREIGN PATENT DOCUMENTS

| | | |
|---|---|---|
| EP | 0340129 A1 | 11/1989 |
| EP | 0382370 A1 | 8/1990 |
| FR | 2395952 | 1/1979 |
| GB | 2001303 A | 1/1979 |

\* cited by examiner

*Primary Examiner* — Ling Choi
*Assistant Examiner* — Chun-Cheng Wang
(74) *Attorney, Agent, or Firm* — Dentons US LLP

(57) ABSTRACT

The invention relates to the use of a precipitated silica, pretreated by at least one organosilane hydrophobic compound or one hydrophobic silicone oil, as a reinforcing filler for silicone elastomer, the pretreated silica being incorporated in the silicone elastomer by cold mixing and having the following features: —a BET specific surface ranging from 50 to 450 $m^2/g$, —a water wettability lower than 80, —a sulfur content lower than 0.1% by weight. The invention is directed to the curable silicone elastomer composition thus obtained.

35 Claims, No Drawings

USE OF A PRETREATED PRECIPITATED SILICA AS A REINFORCING FILLER FOR SILICON ELASTOMER AND THE CURABLE SILICONE ELASTOMER COMPOSITIONS THUS OBTAINED BY COLD MIXING

The present invention relates to the use of a pretreated precipitated silica as a reinforcing filler for silicone elastomer and to the curable silicone elastomer compositions thus obtained.

It is known that silicone elastomer is a specific synthetic elastomer that gives a very good compromise of mechanical and chemical properties required by many industrial applications (for instance, electrical performance, chemical resistance, high temperature stability). It can be used too in pharmaceutical and health care applications.

Silicone polymer by itself is relatively weak. To obtain useful engineering properties, it is necessary to reinforce this silicone elastomer by the incorporation of a filler, chemically compatible with such an elastomer. Moreover, the addition of a reactive fluid called process aid or plasticizer (or even softener or antistructural agent) during the mixing of silicone elastomer and filler (i.e. the compounding phase) is needed for processability as well as good shelf life control. Therefore, silicone elastomer, reinforcing filler and process aid (plasticizer) are the main ingredients of silicone elastomer compositions. Curing compounds are then required for vulcanization.

Reinforcing fillers provide mechanical strength. It is well known in the art to use fumed silica as a reinforcing filler for silicone rubber compositions. Pyrogenic silicas are employed as reinforcing components in silicone rubber compositions; but the obtained properties are not always satisfactory and the pyrogenic silicas have also the disadvantage of being quite expensive.

Other reinforcing fillers for silicone elastomers consist in precipitated silicas. However, precipitated silicas do not often give mechanical properties as high as those obtained by using fumed silica. Moreover, because of the presence of absorbed water on their surface, sponging may happen during the curing step, unless pressure can be maintained; hence, precipitated silicas are mainly employed to reinforce silicone elastomer compositions for molding process application.

Process aids (or platicizers) are functional liquids (or chemicals which hydrolyse during compounding to produce such liquids) which chemically modify the surface of the silica reinforcing fillers in order to reduce the level of silicone elastomer/filler interaction. Whitout the use of process aid, an hydrogen bonding is formed; as a matter of fact, the pendant hydroxyl (OH) groups on the filler surface form secondary bonds with the oxygen (O) in the silicone elastomer backbone; this increases as a function of time so that an uncured composition containing only silicone elastomer and silica filler will harden or structure as it ages: this effect is known as "crepe hardening" effect. This adversely affects the processability of the composition such that it crumbles and cracks on the mill instead of forming a smooth, continuous band.

The silicone elastomers are generally mixed (mixing or compounding phase) with the other components in an internal mixer (Banbury type mixer or doughmixer for example). The silicone elastomer is the most often loaded first, followed by the process aid, the reinforcing filler and possible additives, but this sequence can be modified.

The addition of a process aid during the compounding phase requires heating treatment: the reinforcing silica filler is introduced in the silicone elastomer by hot mixing, which allows also to devolitilize the composition and stabilize properties.

The hot mixing processes consume a lot of energy. Moreover, the mixing times of these processes are generally high, and then penalizes the productivity. At last, the process aids are not always cheap components.

One of the aims of the present invention is to provide an alternative to the reinforcing processes of the prior art.

One objective of the present invention is to allow to obtain curable reinforced silicone elastomer compositions without carrying out hot mixing, i.e. without bringing heat during the compounding (mixing) phase, with reduced mixing time, and, preferably, without addition of any process aid/plasticizer during the incorporation of the reinforcing filler in the silicone elastomer.

The silicone elastomer/reinforcing filler mixing carried out within the scope of the invention is a cold mixing process, i.e. wherein the reinforcing filler could be incorporated in the silicone elastomer by mixing at room temperature.

Moreover, it is a fast mixing process; the mixing time is decreased in comparison with the mixing time in hot mixing process.

In addition, one aim of the invention is to provide reinforced silicone elastomer compositions showing very good physical properties, at least similar to those obtained by performing hot mixing, in particular in terms of plasticity (initial plasticity, plasticity evolution over time).

At last, the properties of the cured compositions obtained by curing these reinforced silicone elastomer compositions according to the invention are very satisfactory.

For these aims, the main object of the invention is the use of a precipitated silica, pretreated by at least one organosilane hydrophobing compound or one hydrophobing silicone oil, as a reinforceing filler for silicone elastomer, the said pretreated silica being incorporated in the silicone elastomer by cold mixing, the said pretreated silica having the following characteristics:

a BET specific surface area ranging from 50 to 450 m$^2$/g,
a water wettability lower than 80,
a sulfur content lower than 0.1% by weight.

In the present description, the pretreated (or modified in surface) silica corresponds to the silica obtained after the treatment of the precipitated silica by at least one organosilane hydrophobing compound or one hydrophobing silicone oil. In the same manner, the non-pretreated silica corresponds to the precipitated silica before treatment by at least one organosilane hydrophobing compound or one hydrophobing silicone oil; the non-pretreated silica is the precipitated silica from which is obtained the pretreated silica.

By precipitated silica it is meant any silica obtained by precipitation reaction of a silicate, such as alkaline metal silicate (sodium silicate for instance), with an acid (sulfuric acid for instance); any silica precipitation process could be used here: in particular, addition of acid in a silicate medium, total or partial simultaneous addition of acid and silicate in a water or silicate medium.

The pretreated silica used in the present invention has a BET specific surface ranging from 50 to 450 m$^2$/g, preferably from 60 to 250 m$^2$/g, in particular from 65 to 150 m$^2$/g. This BET specific surface could be comprised between 75 and 110 m$^2$/g.

The BET specific surface is determined by the BRUNAUER-EMMET-TELLER method described in the *Journal of the American Chemical Society*, Vol. 60, page 309, February 1938 and is in accordance with NF T 45007 standard (November 1987).

The water wettability of the pretreated silica employed in the invention is lower than 80, and is preferably ranging from 10 to 75, in particular from 35 to 75. It could be ranging from 50 to 75, for example from 55 to 70.

The water wettability (or hydrophobization index) is determined by the volume V of methanol that must be added to a mixture consisting of 50 ml water and 200 mg $SiO_2$ to form a homogeneous suspension. The water wettability is equal to $[V/(V+50)] \times 100$.

The pretreated silica carried out in the instant invention has a sulfur content lower than 0.1%, preferably lower than 0.05%, by weight.

The said pretreated silica generally shows a carbon content of at least 1.8%, preferably ranging from 2 to 5%, by weight. Its carbon content could be comprised between 2 and 4%, for example between 2 and 3%, by weight.

Advantageously, the pretreated silica used according to the invention has a parameter C lower than 80, preferably lower than 50, in particular lower than 30. It is generally greater than 15.

The parameter C (or BET constant C) is an exponential function of the net heat of an inert gas adsorption on the inorganic material (silica) surface, which determines the surface polarity of the inorganic material (silica). The net heat of adsorption is correlated with the concentration of residual surface polar group. The parameter C reflects the degree of hydrophobicity of the silica: the more hydrophobic the silica is, the smaller is the parameter C. More details are mentioned in U.S. Pat. No. 6,193,412.

The pretreated silica preferably presents a median particle size lower than 30 µm, in particular lower than 25 µm, for instance lower than 20 µm. Its median particle size could be lower than 15 µm, for example lower than 10 µm, or even lower than 5 µm. It is generally greater than 1 µm.

The mean particle size is measured by the following method:

This method consists in a granulometric analysis of the silica in absolute ethanol with a laser diffraction granulometer. The following apparatus/materials are used: a laser diffraction granulometer Malvern Mastersizer 2000 (module: hydro 2000 S; pump speed: 1700 rpm; analysis time: 12 seconds; optical model: P2 silica in ethanol), a tall beaker of 50 ml, a precision balance, a measuring cylinder of 50 ml, absolute ethanol, a magnetic stirrer, a Pasteur pipette.

The basin of the granulometer is rinced twice with absolute ethanol. The method is then performed as follows:
- weighing 2 g of powder silica sample and putting these 2 g in the beaker,
- adding 50 ml of absolute ethanol in the beaker and stirring 5 minutes with a magnetic stirrer,
- pouring the obtained sample solution with a Pasteur pipette in the basin of the granulometer (the sample solution must be taken from the beaker during stirring so as to have an homogeneous sample solution in the pipette and the same sample solution must not be kept in the pipette so as to avoid sedimentation), until getting an optical concentration between about 10 and 20%, usually of 10%,
- inputing the parameters in the computer,
- running the analytical cycle,
- rincing twice the basin of the granulometer with absolute ethanol.

Preferably, the difference in water uptake, measured at 20° C., with a controlled relative humidity of 71% (respectively 51%), between the non-pretreated and the pretreated silica is of at least 1.5% (respectively of at least 1.0%). In particular, the decreasing of the water uptake of the silica after the treatment by the organosilane hydrophobing compound or the hydrophobing silicone oil shows that the surface silanol groups have been neutralized in great part.

The water uptake represents the amount of water absorbed by a silica sample under a given relative humidity (51 or 71%).

In the present case, the water uptake is measured as follows:

Initially, the silica sample is subjected to desorption at 200° C. in a drying oven for 3 hours. Subsequently the silica sample is placed in a dessicator at constant relative humidity (51% or 71%) and constant temperature (20° C.). The water uptake is measured by the weight of the sample in percent relative to the dry product.

The features of the non-pretreated precipitated silica (from which the pretreated silica is obtained) may be of importance.

Preferably, this non-pretreated silica is microporous and generally presents a BET specific surface, $S_{BET}$, and a CTAB specific surface, $S_{CTAB}$, such that their difference ($S_{BET} - S_{CTAB}$) is higher than 25 m$^2$/g, in particular higher than 35 m$^2$/g.

The CTAB specific surface is the external surface area determined by the absorption of trimethyl cetyl ammonium according to NF T 45007 standard (November 1987) (5.12).

Usually, the non-pretreated silica has a BET specific surface ranging from 110 to 300 m$^2$/g, preferably from 150 to 250 m$^2$/g and for example from 185 to 230 m$^2$/g. It has generally a CTAB specific surface ranging from 70 to 230 m$^2$/g, preferably from 110 to 190 m$^2$/g and for example from 115 to 185 m$^2$/g.

The sulfur content of the non-pretreated silica is preferably less than 0.1%, in particular less than 0.05%, by weight.

The non-pretreated silica may present a pH ranging from 5.0 to 6.5, in particular from 5.4 to 6.3.

The pH is measured in accordance with ISO 787/9 standard (pH of a suspension of 5% in water).

The non-pretreated silica may possess an aluminum content, expressed as $Al_2O_3$, of at least 0.15% by weight, in particular between 0.15% and 0.6% by weight; this content is for example ranging from 0.2 to 0.4% by weight.

Most often, within the scope of the invention, it is used from 10 to 60 parts, in particular from 20 to 60 parts, for example from 30 to 50 parts, by weight, of pretreated silica, for 100 parts by weight of silicone elastomer.

In one embodiment of the invention, the precipitated silica is pretreated by at least one hydrophobing silicone oil, preferably a polysiloxane oil, in particular a polydimethylsiloxane oil or a hydroxy terminated polysiloxane oil.

According to one variant of this embodiment, the pre-treatment could be performed as follows:

The precipitated silica, preferably as an aqueous suspension or slurry (for example with a dry solids content ranging from 14 to 24%, in particular from 18 to 22%, by weight), for instance constituted by a filter cake originating from the precipitation reaction and disintegrated, is mixed with the hydrophobing silicone oil and, preferably, with a surfactant. This mixing is in general carried out at room temperature. The silicone oil/silica weight ratio (based on dry silica weight) may be between 5 and 20%, in particular between 6 and 15%. The surfactant/silica weight ratio (based on dry silica weight) may be between 0 and 2%, in particular between 0.2 and 2%, for instance between 0.5 and 1.5%. After a few minutes of mixing, a stable emulsion is formed, which is further spray-dried to perform a uniform coating of silicone oil onto the precipitated silica. The resulting solid (powder for example) may be then subject to a thermal treatment (at a temperature higher than 200° C.), during more than 1 hour (for example during 2 hours), notably to ensure the permanency of the hydrophobic properties of the pretreated silica.

According to a preferred variant of this embodiment, the pre-treatment rather consists in the following dry impregnation process:

Preferably after having been mixed alone at a temperature ranging from 15 to 100° C., in particular from 50 to 85° C., for example from 65 to 75° C., to ensure an homogeneous temperature distribution within the whole silica particles, the precipitated silica, under solid form, preferably unmilled, is mixed, advantageously under at a temperature ranging from 15 to 100° C., in particular from 50 to 85° C., for example from 65 to 75° C., with the hydrophobing silicone oil (preferably, the hydrophobing silicone oil is added during a few minutes while mixing the precipitated silica, the mixing being then maintained, for instance between 45 and 90 minutes, to ensure an homogeneous surface treatment). In an advantageous manner, the hydrophobing silicone oil is not used under aqueous emulsion form. The silicone oil/silica weight ratio may be between 7 and 22%, in particular between 10 and 18%. A final thermal treatment, notably to ensure the permanency of the hydrophobic properties of the pretreated silica, is generally performed, in particular during more than 1 hour, for instance between 1.5 and 3 hours, at a temperature ranging from 150 to 370° C., preferably from 230 to 360° C.; this temperature could be ranging from 230 to 300° C., in particular from 240 to 295° C., for example from 245 to 290° C., or 245 to 275° C. it could be ranging from 300 to 360° C., in particular from 310 to 360° C., or 310 to 350° C. Then, the obtained silica could be milled to get the desired median particle size.

In another embodiment, the precipitated silica is pretreated by at least one organosilane hydrophobing compound.

The said organosilane hydrophobing compound has preferably the formula $R_nSiX_{(4-n)}$ in which:

R, identical or different, is an alkyl and/or alkenyl radical,

X, identical or different, is an halogen radical or an alkoxy radical or a silanolate radical (such as for example K-silanolate (Si—OK), Na-silanolate (Si—ONa)), n is equal to 1, 2 or 3.

In general, R, identical or different, is a vinyl radical and/or a $C_1$-$C_6$ alkyl radical, preferably methyl, ethyl or propyl.

X, identical or different, is usually an halogen radical, preferably Cl, or a silanolate radical, n is preferably equal to 2.

When the organosilane hydrophobing compound has the above-mentioned formula, the pretreated silica has preferably an organic graft number by $nm^2$ of silica:

greater than 7 if n=1
greater than 3 if n=2
greater than 2 if n=3.

For example, the organosilane hydrophobing compound may be diethyldichlorosilane, trimethylchlorosilane, methyltrichlorosilane, trimethylbutoxysilane, trimethylmethoxysilane, trimethylethoxysilane, dimethyldimethoxysilane, dimethyldiethoxysilane. Preferably, the organosilane hydrophobing compound is dimethyldichlorosilane.

The organosilane hydrophobing compound could be a mixture of dimethyldichlorosilane and methylvinyldichlorosilane. It could be a potassium methylsiliconate.

In the case of the above-mentioned embodiment, the pre-treatment is preferably performed by adding, in particular under agitation, the organosilane hydrophobing compound to an aqueous suspension or slurry (for example with a dry solids content ranging from 3 to 15%, in particular from 5 to 13%, by weight) of the precipitated silica, for instance constituted by a filter cake originating from the precipitation reaction and disintegrated, under neutral or preferably basic pH conditions (pH>7, for instance pH of about 8): it means that the suspension (or slurry) of the precipitated silica with which is mixed the organosilane hydrophobing compound has a neutral or, preferably, a basic pH (pH>7, for instance pH of about 8) before and during the addition of such organosilane compound.

According to one possible alternative, the suspension (or slurry) of the precipitated silica could be kept at room temperature until the end of the addition of the organosilane compound, the temperature being then increased, preferably until a temperature of at least 70° C. (in particular of at least 75° C.), the obtained suspension being then possibly permitted to stand, for example for at least 45 minutes, at the temperature thus attained.

According to another possible alternative, the temperature of the suspension (or slurry) of the precipitated silica is maintained at a high value, preferably at a value of at least 75° C. (in particular of at least 80° C.) during the addition of the organosilane compound, the obtained suspension being then possibly permitted to stand, for example for at least 45 minutes, at the same temperature.

In these both alternative, after the possible standing (ageing), the pH of the obtained suspension is then lowered, preferably until a value less than 6.

The suspension is then filtered/washed and dried (in particular spray-dried).

A further thermal treatment (at a temperature higher than 200° C., and preferably lower than 290° C.), during more than 1 hour (for example during 2 hours), could be performed, notably to ensure the permanency of the hydrophobic properties of the pretreated silica.

The silicone elastomer used in the present invention is generally at least one organopolysiloxane, According to the invention, the silicone elastomer is an organopolysiloxane represented by the average composition formula $R^1_pSiO_{(4-p)/2}$ (1).

In this formula (1), $R^1$, identical or different, represents an unsubstituted or substituted monovalent hydrocarbon group, preferably of 1 to 10 carbon atoms, and more preferably of 1 to 8 carbon atoms, in particular selected among alkyl groups such as methyl group, ethyl group, propyl groups, butyl groups, cycloalkyl groups such as cyclohexyl groups, alkenyl groups such as vinyl groups, allyl groups, butenyl groups, aryl groups such as phenyl groups and tolyl groups, as well as groups in which a portion of, or all of, the hydrogen atoms bonded to carbon atoms within the above groups are substituted with halogen atoms or cyano groups or the like, such as chloromethyl groups, trifluoropropyl groups and cyanoethyl groups.

At least 80 mol %, in particular at least 95 mol %, of the $R^1$ groups are preferably methyl groups.

Furthermore, the ratio of incorporation of alkenyl groups within the total amount of $R^1$ groups should preferably be from 0.01 to 20 mol %, and even more preferably from 0.025 to 5 mol %. At values less than 0.01 mol %, the vulcanisation may be unsatisfactory, whereas at values exceeding 20 mol %, the workability and mechanical characteristics of the rubber may deteriorate.

Furthermore, p is a number ranging from 1.90 to 2.05.

The organopolysiloxane of formula (1) should preferably be basically a straight chain structure, although it may also be a mixture of two or more compounds with different molecular structures. The molecular chain terminals should preferably be blocked with vinyl group containing silyl groups such as dimethylvinylsilyl groups, methyldivinylsilyl groups or trivinylsilyl groups. In addition, the average degree of polymerisation of the above organopolysiloxane should generally be from 100 to 20,000, and preferably from 3,000 to 10,000. At values less than 100, good mechanical characteristics may be unachievable, whereas at value exceeding 20,000, the addition of and the mixing with the filler may be difficult.

Generally, the silicone elastomer used in the present invention has less than 1% by weight of organopolysiloxane having a polymerisation degree of 20 or less with terminal hydroxy or alkoxy groups.

The pretreated silica may be used according to the invention under a suspension or slurry form, or preferably under a solid form.

In accordance with the invention, the pretreated silica is advantageously incorporated in the silicone elastomer by mixing at room temperature, in particular between 15 and 25° C.

The mixing (compounding) phase performed within the scope of the invention is then an energy saving process.

The invention permits to decrease the silicone elastomer/reinforcing filler mixing time in comparison with the silicone elastomer/reinforcing filler mixing time in hot mixing process, preferably by a factor of at least 3, for instance 4. In the invention, the silicone elastomer/reinforcing filler mixing time is generally between 0.2 and 5 hours, in particular between 0.2 and 2.5 hours, for example between 0.4 and 1.5 hours.

The mixing phase performed within the scope of the invention is then a productivity increase process.

The pretreated silica is incorporated in the silicone elastomer by cold mixing preferably without addition of any process aid/plasticizer.

The mixing phase performed within the scope of the invention is preferably a cost reduction process.

The silicone elastomer compositions obtained by the use according to the present invention present physical properties at least as good as these obtained by performing hot mixing, in particular in terms of plasticity.

The invention allows to decrease the rise in plasticity over time of the silicone elastomer mixed with the said pretreated silica, i.e. of the silicone elastomer composition obtained.

The silicone elastomer mixed with the pretreated silica, in accordance with the invention, and then the silicone elastomer composition obtained have generally an initial plasticity ranging from 200 to 300. The viscosity of the silicone elastomer composition is not too high and this composition is not too sticky: the processability is very satisfactory.

The rise of the initial plasticity after 24 hours of the silicone elastomer mixed with the pretreated silica, i.e. of the obtained silicone elastomer composition, according to the invention is generally lower than 110, in particular lower than 90 and even for instance lower than 70 (especially when an alkylsilane hydrophobing compound or a hydrophobing silicone oil is used). No crepe hardening effect occurs.

The plasticity is measured in accordance with JIS K 6249 standard (2003).

The silicone elastomer compositions obtained by the use of the above-defined pretreated silica are advantageously not subject when ageing to a phenomenon of haze.

The present invention has also for object the curable silicone elastomer compositions comprising at least one silicone and at least one reinforcing filler, wherein the above-described use of the pretreated precipitation silica is performed.

The invention is also directed to the compositions obtained by curing the above-mentioned compositions of the invention.

Curing is in general high temperature curing, preferably at a temperature of at least 150° C. Known curing additives could be used.

The present invention is at last directed to the finished articles formed by a cured composition of the invention, which could be employed in many applications, for example, for rubber contacts of electronic calculators and push button phone, keyboards.

The properties of the cured compositions of the invention are very satisfactory.

In general their hardness (Durometer A) at press cure is of at least 45, for instance of at least 50 and their compression set (150° C., 22 hours) at press cure is lower than 30, for example lower than 25 or even lower than 20.

The following non-limitative examples are given to further illustrate the present invention.

EXAMPLES

In examples 1 to 4, the precipitated silica which is initially used is under the form of a slurry (with a dry solids content of 20% by weight) constituted by a filter cake originating from the precipitation reaction of Z132 (silica manufactured by Rhodia) and disintegrated. Thus, in these examples, "precipitated silica" means said slurry.

Example 1

Into a 3 L (liters) reactor equipped with a pH and temperature controlled system, under agitation (Mixel TT—300 rpm (revolutions per minute)), 500 g of deionized water and 500 g of precipitated silica are introduced. The reaction medium is homogenized and temperature kept at room temperature. The pH is then stabilized at a pH of 8 using sodium hydroxide solution (3M). Pure dimethyldichlorosilane is simultaneously introduced during 25 min with a sodium hydroxide solution (3M) at a rate such as to maintain the pH at its initial value. After the end of this simultaneous addition, the temperature of the reaction medium is increased until a value of 80° C. and the suspension thus obtained is permitted to stand for 1 hour at 80° C. Afterwards, the pH of the suspension is lowered below 6 by the addition of sulfuric acid solution (80 g/L).

The suspension is then filtered, washed with water and dried (70° C., 1 night).

A further thermal treatment at a temperature equal to 250° C., during 2 hours, is performed on the silica.

The features of the pretreated silica thus obtained (silica S1) are reported in the below table.

|  |  | S1 |
|---|---|---|
| BET specific surface |  | 79 m$^2$/g |
| Water wettability |  | 63 |
| Sulfur content, by wt |  | 0.03% |
| Carbon content, by wt |  | 3.1% |
| Parameter C |  | 22 |
| Water uptake | RH 51% | 5.69 |
|  | RH 71% | 5.78 |
| Graft number |  | 6.5/nm$^2$ |
| Dry solids content, by wt |  | 98.6% |

Example 2

1250 g of precipitated silica are mixed, using an ultra-turrax device, with 25 g of hydrophobing silicone oil (polydimethylsiloxane, OH-terminated: X93-1509, viscosity of 60 mm$^2$/s at 25° C.) and 2.5 g of surfactant (Antarox SC 138 commercilalized by Rhodia) for 10 min, at room temperature. A stable emulsion is thus formed, which is further spray-dried (exit temperature: about 115° C.) to perform a uniform coating of silicon oil onto the precipitated silica. The resulting powder is then subjected to a thermal treatment at 350° C. during 2 hours.

The features of the pretreated silica thus obtained (silica S2) are reported in the below table.

|  |  | S2 |
|---|---|---|
| BET specific surface |  | 91 m$^2$/g |
| Water wettability |  | 58 |
| Sulfur content, by wt |  | <0.01% |
| Carbon content, by wt |  | 2.6% |
| Parameter C |  | 20 |
| Water uptake | RH 51% | 5.31 |
|  | RH 71% | 5.97 |
| Graft number |  | 5.4/nm$^2$ |
| Dry solids content, by wt |  | 98.0% |

Example 3

Into a 3 L reactor equipped with a pH and temperature controlled system, under agitation (Mixel TT—300 rpm), 750 g of deionized water, 9 g of sodium, sulfate and 250 g of precipitated silica are introduced. The reaction medium is homogenized and temperature rised up to 90° C. The pH is then stabilized at a pH of 8 using sodium hydroxide solution (3M). Potassium methylsiliconate (230 g/L) is simultaneously introduced during 40 min with a sulfuric acid solution (80 g/L) at a rate such as to maintain the pH at its initial value. After the end of this simultaneous addition, the pH of the suspension is lowered below 6 by the addition of sulfuric acid solution (80 g/L).

The suspension is then filtered, washed with water and spray-dried (exit temperature: about 115° C.).

The features of the pretreated silica thus obtained (silica S3) are reported in the below table.

|  |  | S3 |
|---|---|---|
| BET specific surface |  | 103 m$^2$/g |
| Water wettability |  | 10 |
| Sulfur content, by wt |  | 0.03% |
| Carbon content, by wt |  | 2.7% |
| Parameter C |  | 43 |
| Water uptake | RH 51% | 5.67 |
|  | RH 71% | 5.70 |
| Graft number |  | 11.2/nm$^2$ |
| Dry solids content, by wt |  | 93.6% |

Example 4

Into a 3 L reactor equipped with a pH and temperature controlled system, under agitation (Mixel TT—300 rpm), 500 g of deionized water and 500 g of precipitated silica are introduced. The reaction medium is homogenized and temperature kept at room temperature. The pH is then stabilized at a pH of 8 using sodium hydroxide solution (3M). A mixture of dimethyldichlorosilane and methylvinyldichlorosilane (with a dimethyldichlorosilane/methylvinyldichlorosilane molar ratio of 97.5/2.5) is simultaneously introduced during 25 min with a sodium hydroxide solution (3M) at a rate such as to maintain the pH at its initial value. After the end of this simultaneous addition, the temperature of the reaction medium is increased until a value of 80° C. and the suspension thus obtained is permitted to stand for 1 hour at 80° C. Afterwards, the pH of the suspension is lowered below 6 by the addition of sulfuric acid solution (80 g/L).

The suspension is then filtered, washed with water and dried (70° C., 1 night).

A further thermal treatment at a temperature equal to 250° C., during 2 hours, is performed on the silica.

The features of the pretreated silica thus obtained (silica S4) are reported in the below table.

|  |  | S4 |
|---|---|---|
| BET specific surface |  | 91 m$^2$/g |
| Water wettability |  | 60 |
| Sulfur content, by wt |  | <0.01% |
| Carbon content, by wt |  | 2.6% |
| Parameter C |  | 26 |
| Water uptake | RH 51% | 5.77 |
|  | RH 71% | 5.94 |
| Graft number |  | 5.5/nm$^2$ |
| Dry solids content, by wt |  | 95.5% |

Example 5

In this example, the precipitated silica which is initially used is unmilled Z132 (silica manufactured by Rhodia), which is under powder form and presents the following features:

|  |  | |
|---|---|---|
| BET specific surface |  | 205 m$^2$/g |
| CTAB specific surface |  | 125 m$^2$/g |
| Sulfur content, by wt |  | 0.04% |
| Median particle size (*) |  | 130 μm |
| Water uptake | RH 51% | 7.70 |
|  | RH 71% | 8.75 |
| Dry solids content, by wt |  | 94.0% |

(*) measured with Malvern method (by replacing absolute ethanol by water in the above-described method)

800 g of are introduced into a 5 L Lödige. Mixing of the powder is then performed for 1 hour, while increasing the reaction medium temperature up to 70° C. A further 1 hour of mixing at 70° C. is made.

While mixing, 112 g of silicone oil (polydimethylsiloxane, OH-terminated: X93-1509, viscosity of 60 mm$^2$/s at 25° C.) are added in 10 min. Afterwards, 1 more hour of mixing is performed.

A thermal treatment at a temperature equal to 300° C. is then performed for 2 hours on the silica.

The silica is finally milled to get a median particle size of 23.2 μm.

The features of the pretreated silica thus obtained (silica S5) are reported in the below table.

|  |  | S5 |
|---|---|---|
| BET specific surface |  | 65 m$^2$/g |
| Water wettability |  | 70 |
| Sulfur content (by wt) |  | 0.02% |
| Carbon content (by wt) |  | 4.1% |
| Parameter C |  | 16 |
| Water uptake | RH 51% | 5.73 |
|  | RH 71% | 6.56 |
| Graft number |  | 8.2/nm$^2$ |
| Dry solids content, by wt |  | 95.0% |

Example 6

This example illustrates the use and behaviour of pre-treated precipitated silicas as prepared in examples 1 to 5 (S1, S2, S3, S4 and S5) in a silicone elastomer composition.

The compositions are prepared in the following way.

100 parts by weight of an organopolysiloxane containing 99.825 mol % of dimethylsiloxane units, 0.15 mol % of methylvinylsiloxane units and 0.025 mol % of dimethylvinylsiloxane units, with an average degree of polymerisation of 8,000 are mixed with 40 parts by weight of pretreated or non-pretreated silica in a kneader to produce a base composition at room temperature, without bringing heat during this mixing (compounding) phase. The mixing time has been 1 hour. It is a fast mixing process.

By using in the same mixing, instead of one of the pre-treated silicas, a non-pretreated precipitated silica consisting in Z132 (silica manufactured by Rhodia)—which has been milled until having a mean particle size of 11 μm (measured with Malvern method (by replacing absolute ethanol by water in the above-described method)) and which presents the other features mentioned above in the first table of Example 5—it has not been possible to prepare in the kneader a base composition; as a matter of fact, it has not been possible to incorporate the non-pretreated precipitated silica in the organopolysiloxane.

To each base composition obtained with one pretreated precipitated silica (S1, S2, S3, S4 or S5) is added 0.5 parts by weight of 2,5-dimethyl-2,5-di(tertiary-buthylperoxy)hexane using a two-roll mill the mixture is then heated at a temperature of 165 C for 10 min and pressure molded to yield a 2 mm sheet.

Subsequent post curing is performed at a temperature of 200 C for 4 hours.

The mechanical/physical properties of the 5 final compositions are measured in accordance with JIS K 6249 standard (2003) (with press cure condition: 165° C./10 min, post cure condition: 200° C./4 hours). The corresponding results are given in Table 1.

TABLE 1

|  | S1 | S2 | S3 | S4 | S5 |
|---|---|---|---|---|---|
| Press cure |  |  |  |  |  |
| Hardness, DurometerA | 53 | 50 | 52 | 59 | 52 |
| Tensil Strength (Mpa) | 6.5 | 6.4 | 4.0 | 6.8 | 5.2 |
| Elongation (%) | 510 | 560 | 440 | 330 | 480 |
| Rebound (%) | 65 | 65 | 65 | 65 | 70 |
| Compression Set 150° C./22 h (%) | 17 | 26 | 27 | 28 | 15 |
| Post cure |  |  |  |  |  |
| Hardness, DurometerA | 56 | 55 | 57 | 62 | 54 |
| Tensil Strength (Mpa) | 7.6 | 7.4 | 5.0 | 6.9 | 6.1 |
| Elongation (%) | 480 | 490 | 320 | 310 | 480 |
| Rebound (%) | 64 | 62 | 65 | 63 | 71 |
| Compression Set 150° C./22 h (%) | 7 | 9 | 10 | 9 | 4 |
| Plasticity (initial) P0 | 241 | 227 | 224 | 222 | 204 |
| (1 day) P1 | 316 | 286 | 271 | 328 | 242 |
| Δ Plasticity (P1 − P0) | 65 | 59 | 47 | 106 | 38 |

The invention claimed is:

1. A method of reinforcing a silicone elastomer, the method comprising cold mixing a precipitated silica, pretreated with at least one organosilane hydrophobing compound or one hydrophobing silicone oil, with said silicone elastomer, wherein said pretreated silica has the following properties:
   (a) a median particle size lower than 30 μm,
   (b) a BET specific surface ranging from 50 to 450 m$^2$/g,
   (c) a water wettability lower than 80, and
   (d) a sulfur content lower than 0.1% by weight;
   and wherein the silica before treatment with at least one organosilane hydrophobing compound or one hydrophobing silicone oil presents a BET specific surface $S_{BET}$, and a CTAB specific surface, $S_{CTAB}$, such that their difference ($S_{BET}-S_{CTAB}$) is greater than 25 m$^2$/g.

2. The method according to claim 1, wherein said pretreated silica has a BET specific surface ranging from 60 to 250 m$^2$/g.

3. The method according to claim 1, wherein said pretreated silica presents water wettability ranging from 10 to 75.

4. The method according to claim 1, wherein said pretreated silica has a sulfur content lower than 0.05% by weight.

5. The method according to claim 1, wherein said pretreated silica has a carbon content of at least 1.8% by weight.

6. The method according to claim 1, wherein said pretreated silica presents a parameter C lower than 80.

7. The method according to claim 1, wherein the difference in water uptake, measured at 20° C., with a controlled relative humidity of 71%, between the silica before treatment and the pretreated silica is at least 1.5%.

8. The method according to claim 1, wherein the difference in water uptake, measured at 20° C., with a controlled relative humidity of 51%, between the silica before treatment and the pretreated silica is at least 1.0%.

9. The method according to claim 1, wherein the silica before treatment has a BET specific surface ranging from 110 to 300 m$^2$/g, and a CTAB specific surface ranging from 70 to 230 m$^2$/g.

10. The method according to claim 1, wherein the silica before treatment has a sulfur content lower than 0.1% by weight.

11. The method according to claim 1 of a precipitated silica, pretreated by at least one organosilane hydrophobing compound.

12. The method according to claim 11, wherein the organosilane hydrophobing compound has the formula $R_nSiX_{(4-n)}$ in which:
   R, identical or different, is an alkyl and/or alkenyl radical,
   X, identical or different, is an halogen radical or an alkoxy radical or a silanolate radical,
   n is equal to 1, 2 or 3.

13. The method according to claim 12, wherein R, identical or different, is a vinyl radical and/or an alkyl radical.

14. The method according to claim 12, wherein X, identical or different, is a halogen radical or a silanolate radical.

15. The method according to claim 12, wherein the pretreated silica has an organic graft number by nm$^2$ of silica:
   greater than 7 if n=1
   greater than 3 if n=2
   greater than 2 if n=3.

16. The method according to claim 11, wherein the organosilane hydrophobing compound is dimethyldichlorosilane, a mixture of dimethyldichlorosilane and methylvinyldichlorosilane, or a potassium methylsiliconate.

17. The method according to claim 11, wherein pre-treatment of the precipitated silica comprises the addition of the organosilane hydrophobing compound to an aqueous suspension or slurry of the precipitated silica under neutral or basic pH conditions.

18. The method according to claim 1, of a precipitated silica, pretreated by at least one hydrophobing silicone oil or a hydroxy terminated polysiloxane oil.

19. The method according to claim 18, wherein pre-treatment of the precipitated silica comprises the dry impregnation of the precipitated silica, in solid form, by the hydrophobing silicone oil, the hydrophobing silicone oil being not under aqueous emulsion form.

20. The method according to claim 1, wherein the silicone elastomer is at least one organopolysiloxane.

21. The method according to claim 20, wherein the silicone elastomer is an organopolysiloxane represented by the average composition formula $R^1_p SiO_{(4-p)/2}$ in which $R^1$, identical or different, represents an unsubstituted or substituted monovalent hydrocarbon group, and p is a number ranging from 1.90 to 2.05.

22. The method according to claim 21, wherein at least 80 mol % of the $R^1$ groups are methyl groups.

23. The method according to claim 21, wherein the ratio of incorporation of alkenyl groups within the total amount of $R^1$ groups is from 0.01 to 20 mol %.

24. The method according to claim 20, wherein the silicone elastomer has less than 1% by weight of organopolysiloxane having a polymerisation degree of 20 or less with terminal hydroxy or alkoxy groups.

25. The method according to claim 1, wherein the said pretreated silica is incorporated in the silicone elastomer by mixing at a temperature between 15 and 25° C.

26. The method according to claim 1, wherein the said pretreated silica is incorporated in the silicone elastomer by cold mixing without addition of any process aid/plasticizer.

27. The method according to claim 1, wherein the silicone elastomer/reinforcing filler mixing time is between 0.2 and 5 hours.

28. The method according to claim 1, wherein the said pretreated silica is incorporated in the silicone elastomer by mixing at room temperature without addition of any process aid/plasticizer, the silicone elastomer/reinforcing filler mixing time being between 0.2 and 5 hours.

29. The method according to claim 1 wherein the time required for mixing the silicone elastomer with the reinforcing filler is less than the time that would have been required to mix the silicone elastomer, the precipitated silica and the at least one organosilane hydrophobing compound or one hydrophobing silicone oil.

30. The method according to claim 1 wherein the increase in plasticity in a cured composition of the silicone elastomer mixed with the reinforcing filler is less than the increase in plasticity in a cured composition of the silicone elastomer with the precipitated silica and the at least one organosilane hydrophobing compound or one hydrophobing silicone oil.

31. The method according to claim 1, wherein the silicone elastomer mixed with the said pretreated silica has an initial plasticity ranging from 200 to 300.

32. The method according to claim 1, wherein the rise of the initial plasticity after 24 hours of the silicone elastomer mixed with the said pretreated silica is lower than 110.

33. A curable silicone elastomer composition comprising at least one silicone elastomer and at least one reinforcing filler,
wherein the reinforcing filler comprises a precipitated silica, pretreated with at least one organosilane hydrophobing compound or one hydrophobing silicone oil,
said pretreated silica has the following properties:
(a) a median particle size lower than 30 µm,
(b) a BET specific surface ranging from 50 to 450 m²/g,
(c) a water wettability lower than 80, and
(d) a sulfur content lower than 0.1% by weight;
and wherein the silica before treatment with at least one organosilane hydrophobing compound or one hydrophobing silicone oil presents a BET specific surface $S_{BET}$, and a CTAB specific surface, $S_{CTAB}$, such that their difference ($S_{BET} - S_{CTAB}$) is greater than 25 m²/g, said reinforcing filler having been cold mixed with said silicone elastomer.

34. A composition obtained by curing the composition according to claim 33.

35. A finished article formed from a cured composition according to claim 34.

* * * * *